United States Patent [19]

Burdon, Jr.

[11] Patent Number: 4,491,208
[45] Date of Patent: Jan. 1, 1985

[54] HYDRAULIC CONTROL SYSTEM FOR A HYDROSTATIC TRANSMISSION AND CLUTCHES

[75] Inventor: Kenneth A. Burdon, Jr., Bellevue, Wash.

[73] Assignee: PACCAR Inc., Bellevue, Wash.

[21] Appl. No.: 334,631

[22] Filed: Dec. 28, 1981

[51] Int. Cl.³ .............................................. B60K 41/26
[52] U.S. Cl. .................................. 192/4 R; 192/0.09; 254/346; 254/361
[58] Field of Search ............... 192/0.032, 0.042, 0.044, 192/0.046, 0.08, 0.09, 0.092, 0.098, 3.57, 3.61, 3.62, 4 C, 4 R, 48.4, 48.6, 48.8, 48.92, 87.1–87.19; 254/328, 344, 346, 349, 361, 367

[56] References Cited

U.S. PATENT DOCUMENTS

| 3,729,171 | 4/1973 | Yates et al. | 254/346 |
| 4,090,693 | 5/1978 | Hoehn et al. | 254/349 |
| 4,185,520 | 1/1980 | Henneman et al. | 192/4 R |

*Primary Examiner*—George H. Krizmanich
*Assistant Examiner*—M. Manley

*Attorney, Agent, or Firm*—Seed and Berry

[57] ABSTRACT

The hydraulic control system of this invention uses a series of hydraulic valves for directing hydraulic fluid to energize and pressurize rapidly the various clutches of a hydraulically driven transmission, while protecting the input clutch of the pump. A restrictor check valve slows the rate at which the input clutch disengages the pump from the power takeoff, thereby ensuring that the variable displacement pump destrokes during backdriving before the input clutch disengages. A sequence valve is ordinarily used to ensure that the winch is deactivated by dumping pressure in the system and by destroking the pump when control pressure in the system drops below a predetermined level. The hydraulic controls include a single-lever, four-function control valve for selecting four modes of operation: brake-off, reverse, free-spool, and forward, and a range selector for selecting between high and low range. Three three-way valves are used to shuttle hydraulic fluid to the main drive clutches (i.e., the high- and low-speed clutches of the transmission) and the input clutch of the pump.

10 Claims, 1 Drawing Figure

HYDRAULIC CONTROL SYSTEM FOR A HYDROSTATIC TRANSMISSION AND CLUTCHES

TECHNICAL FIELD

This invention relates to an apparatus for controlling the speed and direction of a hydrostatic transmission particularly useful in towing winches on vehicles. More particularly, the invention relates to a control system for a hydrostatic winch having a plurality of clutches.

BACKGROUND ART

Incorporated by reference into this specification, U.S. Pat. Nos. 4,185,520 and 4,275,870 disclose a winch transmission and control which, through selective energization of separate parts of the transmission, enables the winch to change automatically to a different output speed, to produce a fully braked condition, or to freewheel. Although satisfactory in some applications for controlling a hydrostatic winch, the single-lever control of U.S. Pat. No. 4,275,870 was erratic in operation and had poor feel. The erratic operation was caused by two factors: (1) the inherent lost motion in the control cables prevented the detented control valve spool from shifting reliably between functions, (2) the lost motion device on the control cam, in conjunction with the inherent characteristics of the hydrostatic transmission, allowed the brake to engage when the pump was still stroking during backdriving of the winch. Poor feel was caused by the cam mechanism which was used to shift the valve spools and by the inherent lost motion in the control cables, U-joints, and linkage.

DISCLOSURE OF INVENTION

A dual-lever hydraulic control system of this invention is particuarly suited for a hydrostatic transmission having a plurality of clutches. The system provides rapid actuation of the clutches through use of a series of hydraulic valves instead of a cam. Power means provide a source of input hydraulic power to activate a variable displacement pump through an input clutch. The pump drives a motor which is coupled between the pump and a transmission. The transmission includes a high-speed clutch, a low-speed clutch, and a freespool clutch. A power output means, such as a cable drum for a winch, is coupled to the transmission. Means are provided for actuating the clutches, including means to select one of four modes: forward, reverse, brakeoff, and freespool, and means for selecting between high and low range. Preferably, the means for actuating the clutches includes a single-lever, four-function control valve and a plurality of three-way valves leading from the lines of the control valve. Three three-way valves are generally used: a first valve before the input clutch of the variable displacement pump; a second, before the high-speed clutch of the transmission; and a third, before the low-speed clutch of the transmission. Ordinarily, a three-way valve is not required before the freespool clutch. A four-way valve allows proper sequencing and selection of the various three-way valves.

To slow the rate at which the input clutch disengages from the power takeoff during backdriving, a restrictor check valve is preferably included in the line between the three-way valve for the input clutch and the input clutch. This valve ensures that the pump destrokes before the clutch disengages. Also, a sequence valve is included in the control system to deactivate the output means by dumping the pressure in the system and by destroking the pump when control pressure in the system drops below a predetermined level.

The system protects the input clutch by preventing the pump from going into stroke when there is inadequate pressure for positive engagement of the input clutch. A dependable, positive control is achieved, which actuates rapidly.

BEST MODE FOR CARRYING OUT THE INVENTION

The Hydraulic Control System

Figure 1:
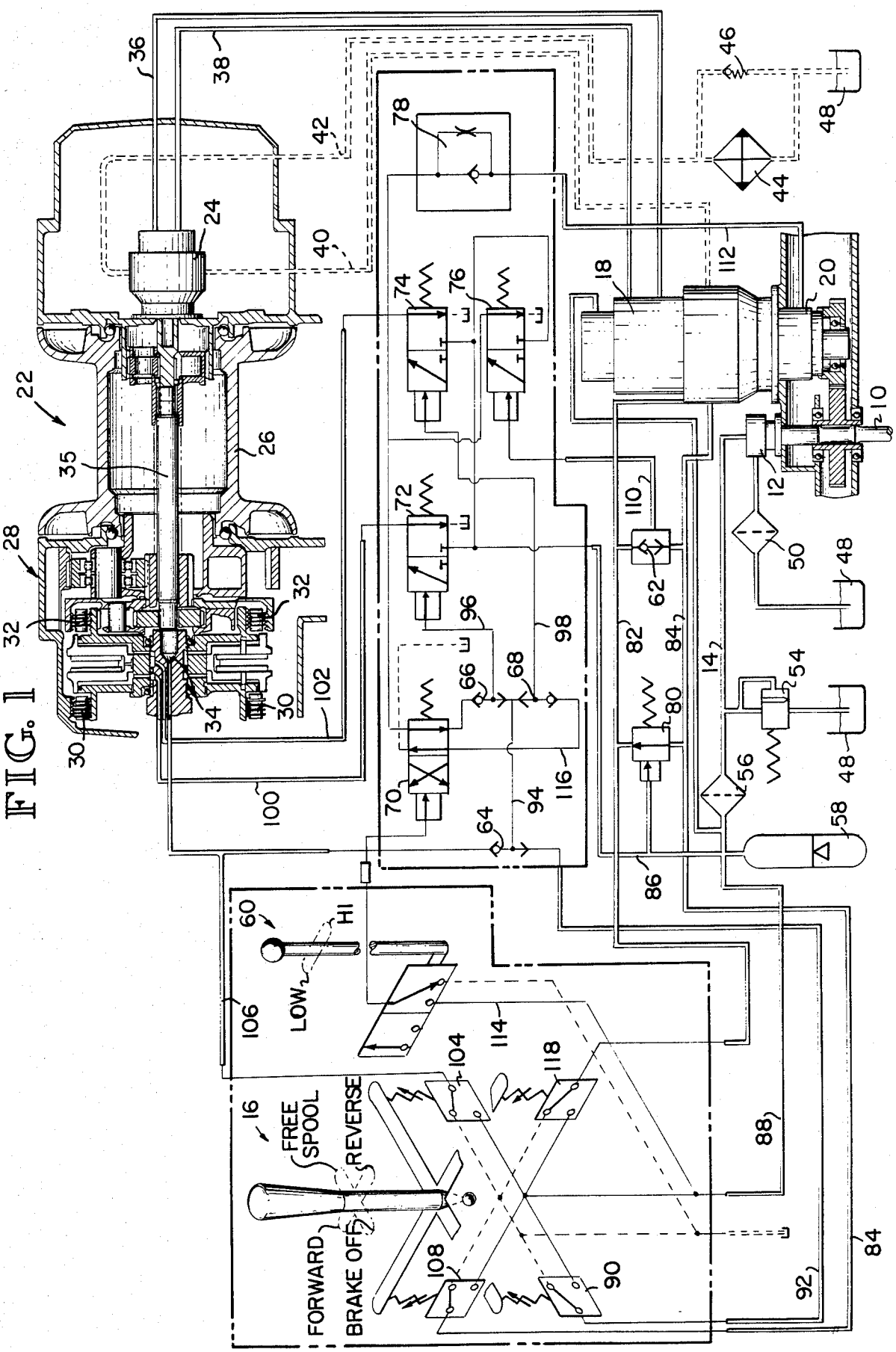
FIG. 1 is a partial schematic detail of the hydraulic control system of this invention, shown controlling a hydrostatic winch.

A power takeoff 10 from a vehicle (not shown) powers a charge pump 12 to feed hydraulic fluid through line 14 to a single-lever, four-function control valve 16, and a variable displacement pump 18 through input clutch 20. The variable displacement pump 18 powers a hydrostatic winch 22 having a fixed displacement motor 24, a cable drum 26, and a transmission 28, which has a plurality of clutches. At least three clutches are provided in the transmission 28. They are a high-speed clutch 30, a low-speed clutch 32, and a freespool clutch 34. Lines 36 and 38 connect the variable displacement pump 18 to the fixed displacement motor 24, while lines 40 and 42 provide cooling for the system by routing hydraulic oil from the variable displacement pump 18, and fixed displacement motor 24 case drains through a heat exchanger 44. A check valve 46 allows cold oil to bypass the heat exchanger 44. A sump 48 is provided for the hydraulic oil. Similarly, a suction strainer 50 protects the charge pump 12. A relief valve 54 is incorporated into the feed line 14 before a filter 56. The feed line 14 branches after an accumulator 58 into pressure lines for the various clutches and pilot lines.

As shown in FIG. 1, the freespool clutch 34 includes a hydraulic piston aligned with the shaft 35 of the winch 22. When pressurized with fluid in line 106, the piston engages the shaft 35 to disengage a sun gear around the shaft 35 from an associated carrier gear in the second stage output of the transmission. Then, the cable drum 26 may be turned manually without opposing the inherent resistance of the low-speed clutch 32.

The control system of this invention includes a single-lever, four-function control valve 16 for selection of one of four modes coupled with a range selector (three-way valve) 60 used to select between high and low range for the transmission 28. The control valve 16 controls selection of brake-off, reverse, freespool, and forward modes. In addition, the control valve 16 is a pressure controller and determines the amount of stroke of the pump. Thus the valve ultimately controls the degree of flow from the pump to the motor. Through a series of shuttle valves 62, 64, 66, and 68, a four-way valve and three three-way valves 72, 74, and 76, the control valve 16 and the three-way valve range selector 60 together control the six functions of the transmission 28: brake-off, freespool, forward high range, forward low range, reverse high range, and reverse low range. A restrictor check valve 78 coupled to the input clutch 20 of the variable displacement pump 18 allows the input clutch 20 to engage rapidly while slowing the rate at which the input clutch 20 disengages. The restrictor check valve 78 thus prevents the pump 18 from rotating too rapidly when the pump is destroked during back-driving by ensuring that the pump destrokes completely before the input clutch 20 disengages from the power takeoff means 10.

Preferably, a sequence valve 80 is mounted across the pilot lines 82 and 84 for the pump 18. The sequence valve 80 deactivates the winch 22 by dumping pressure in the pilot lines 82 and 84 and destroking the pump 18 when control pressure in the system drops below a predetermined level. A controller (not shown) in the pump 18 sets a threshold pressure before which the pump will not begin to stroke. Thus the sequence valve prevents the input clutch 20 from slipping and being damaged in the event that the winch 22 is operated under a load with the input shaft turning at too low a speed which would result in a reduction in the charge pump speed and a reduction in the flow and pressure of hydraulic fluid in the system. Such a condition can occur when the input power to the winch 22 is through a torque converter.

Operation of the System

A. Brake-off

In the brake-off operating condition, the control valve 16 is set in the brake-off position, as indicated in FIG. 1. Hydraulic fluid from the charge pump 12 flows through feed line 14 to branch at the accumulator 58 into lines 86 and 88. With brake-off selected, hydraulic fluid passes through valve 90 into line 92 connected with shuttle valve 64. At the shuttle valve 64, the fluid enters line 94 between shuttle valves 66 and 68. Shuttle valves 66 and 68 split the fluid into lines 96 and 98. Line 96 actuates three-way valve 72, which allows hydraulic fluid from the accumulator 58 through line 100 to the high-speed clutch 30 in the transmission 28. Simultaneously, line 98 actuates three-way valve 74 to allow hydraulic fluid to pass through the three-way valve 74 from line 86 to line 102 and the low-speed clutch 32 in the transmission 28. Thus, in the brake-off position the transmission 28 has both the high-speed clutch 30 and low-speed clutch 32 pressurized and energized to disengage the clutches from the transmission gear train. Activation of the clutches through three-way valves 72 and 74 rather than directly through the control valve 16 allows higher pressure, increased flow, and more rapid actuation without loss of positive easy selection and without damage to the control valve 16. The three-way valves ensure braking unless disengaging is positively selected by the operator.

B. Freespool

The freespool selection is similar to that for the brake-off position. Hydraulic fluid enters feed line 14 and branches at the accumulator 58 into lines 86 and 88. Passing through valve 104 at the control valve 16 into line 106, direct pressurization and energization of the freespool clutch 34 is provided. The freespool clutch 34 is of conventional design and disengages the drive shaft 35 from the transmission 28. Hydraulic fluid passes through shuttle valve 64 to line 94. As with the brake-off selection, hydraulic fluid in line 94 is split by the shuttle valves 66 and 68 into lines 96 and 98, respectively, to actuate three-way valves 72 and 74 so that hydraulic fluid from line 86 may actuate and pressurize the high-speed clutch 30 and low-speed clutch 32 in the transmission 28. In the freespool condition, the cable drum 26 of the winch may be rotated by hand.

C. Forward high range

In the forward high range condition, hydraulic fluid in line 14 again branches at the accumulator 58 into lines 86 and 88. Fluid passes through valve 108 at the control valve 16 into line 84, which is a pilot line for controlling the variable displacement pump 18. The amount the pump 18 goes into stroke and the speed at which the winch drum rotates are proportional to the amount the control valve 16 is moved. The hydraulic fluid enters the controller of the variable displacement pump 18 as well as entering line 110 through shuttle valve 62 to actuate three-way valve 76. Hydraulic fluid passing through line 86 passes through the three-way valve 76 and, in turn, through the four-way valve 70 to shuttle valve 66, which directs the fluid through line 96 to actuate three-way valve 72. Then, hydraulic fluid from the accumulator 58 passes through line 86 through three-way valve 72 into line 100 to pressurize and energize high-speed clutch 30 in the transmission 28. Simultaneously, hydraulic fluid passes through the three-way valve 76 to the restrictor check valve 78 and along the line 112 to the input clutch 20 of the variable displacement pump 18. Thus, the winch's brake is released and the winch is caused to turn in the forward high range direction. For the forward high range, the selector means 60 is set at the high position and hydraulic fluid in line 114 is stopped at the three-way valve range selector 60.

D. Forward low range

In forward low range, hydraulic fluid in line 14 branches at the accumulator 58 into lines 86 and 88. The three-way valve range selector 60 is set in low position so that hydraulic fluid in line 114 passes through the three-way valve 60 to actuate the four-way valve 70 so that hydraulic fluid will pass through line 116 to shuttle valve 68 and into line 98. Fluid also passes through valve 108 into line 84, which, as with the forward high range, enters the controller of the variable displacement pump 18 to stroke the pump and to drive the fixed displacement motor 24 in the forward direction. Hydraulic fluid is shuttled from line 84 through shuttle valve 62 into line 110 to actuate three-way valve 76 so that fluid may enter line 98 and through restrictor valve 78 actuate the input clutch 20 of the variable displacement motor 18. Fluid in line 98 actuates three-way valve 74 to allow hydraulic fluid in line 86 to pass into line 102 to pressurize and energize the low-speed clutch 32 of the transmission 28. Thus the cable drum 26 rotates at low speed in the forward direction.

E. Reverse high range

In reverse high range, hydraulic fluid in line 14 branches at the accumulator 58 into lines 86 and 88. The selector means 60 is set so that hydraulic fluid in line 114 is stopped at the three-way valve 60. Hydraulic fluid in line 88 passes through valve 118 into pilot line 82, which connects with the reverse side of the controller of the variable displacement pump 18. As with the forward conditions, hydraulic fluid in line 82 passes through shuttle valve 62 into line 110 to actuate three-way valve 76, which engages the input clutch 20 of the variable displacement pump 18 through restrictor check valve 78. With three-way valve 76 actuated, hydraulic fluid in line 86 passes through the three-way valve 76, through the four-way valve 70 to be shuttled by shuttle valve 66 into line 96, thereby actuating three-way valve 72 to allow additional fluid from line 86 to pass into line 100, thereby energizing and pressurizing high-speed clutch 30 of the transmission 28. Thus the motor 24 drives the cable drum 26 at high speed in the reverse direction.

F. Reverse low range

In reverse low range, hydraulic fluid in line 14 branches at the accumulator 58 into lines 86 and 88. The range selector 60 is set at low range so fluid in line 114 passes through the valve to actuate the four-way valve 70. Fluid also passes through valve 118 into line 82 to stroke the variable displacement pump 118 and three-way valve 76, as indicated for the reverse high range condition. Activating the four-way valve 70 causes fluid to pass into line 116 and be shuttled in the shuttle valve 68 into line 98. This hydraulic fluid in line 98 actuates three-way valve 74 to allow hydraulic fluid to pass from the accumulator 58 through line 86 into line 102, which energizes and pressurizes the low-speed clutch 32 of the transmission 28. Thus the cable drum 26 turns in the low speed reverse direction.

Thus, the hydraulic control system of this invention protects the pump by controlling the disengagement of the input clutch. Destroking is simply and reliably provided. Delay in actuating the several clutches is also reduced through a series of hydraulic valves. The controller for the variable displacement pump ensures that the clutches will be actuated before the pump begins its stroke, and the system protects the input clutch by preventing the variable displacement pump from going into stroke when there is inadequate pressure for positive engagement of the input clutch. Mechanical means have not proven as reliable.

I claim:

1. A hydraulic control system for a hydrostatic transmission, having a plurality of clutches simultaneously engaged to act as a brake, the system allowing rapid actuation of the clutches, comprising:
   (a) power means for the system, including a charge pump to provide hydraulic control power for the system;
   (b) a reversible drive pump, associated with the power means, for providing the hydraulic power;
   (c) an input clutch for the drive pump between the power means and the drive pump to isolate the drive pump from the power means;
   (d) a transmission including a high-speed clutch, a low-speed clutch, and a freespool clutch;
   (e) power output means coupled to the transmission;
   (f) a motor coupled between the drive pump and the transmission;
   (g) means, associated with the drive pump, for hydraulically actuating the drive pump and the clutches selectively, including selections of four modes: forward, reverse, brake-off, and freespool, including a restrictor check valve means for slowing the rate at which the input clutch disengages the drive pump, ensuring that the drive pump destrokes during backdriving before the input clutch disengages; and
   (h) means for selecting between high speed and low speed.

2. The control system of claim 1 wherein the means for selecting between high and low speed comprises a three-way valve selector.

3. The control system of claim 1 wherein the means for actuating the clutches includes a single-lever, four-function valve for selecting the four modes.

4. The control system of claim 3 wherein the input clutch, high-speed clutch, and low-speed clutch are controlled through three-way valves connecting the control valve to the several clutches.

5. The control system of claims 3 or 4 wherein the freespool clutch is controlled directly from the control valve with a direct line.

6. The control system of claim 1, further comprising a sequence valve means to deactivate the output means by dumping the pressure in the system and destroking the pump when control pressure in the system drops below a predetermined level.

7. The control system of claim 1 wherein the output means is a winch.

8. A hydraulic control system for hydrostatic transmissions and clutches, wherein the clutches are simultaneously engaged to act as a brake, the system allowing rapid actuation of the clutches, comprising:
   (a) power means including a charge pump to provide input hydraulic power;
   (b) a reversible drive pump associated with the power means for pumping hydraulic fluid;
   (c) an input clutch for the drive pump between the power means and the drive pump for isolating the drive pump from the power means;
   (d) a transmission including a high-speed clutch, a low-speed clutch, and a freespool clutch;
   (e) a hydraulic motor coupled between the drive pump and transmission and driven by the drive pump;
   (f) power output means coupled to the motor through the transmission;
   (g) means, associated with the drive pump, for hydraulically actuating the drive pump and the clutches selectively, allowing four-position selection for forward, reverse, brake-off, and freespool, including a control valve having one of its four valve lines coupled directly to the freespool clutch, and three three-way valves, each valve coupled between the control valve and the high-speed clutch, respectively;
   (h) a means for selecting between high speed and low speed;
   (i) a restrictor check valve means between the three-way valve for the input clutch and the input clutch to slow the rate at which the input clutch disengages to disengage the pump, ensuring that the drive pump destrokes during backdriving before the clutch disengages; and
   (j) a sequence valve means to deactivate the power output means by dumping the pressure in the system and by destroking the drive pump when control pressure in the system drops below a predetermined level.

9. A hydraulic control system for a hydrostatic transmission, having a plurality of clutches simultaneously engaged to act as a brake, the system allowing rapid actuation of the clutches, comprising:
   (a) power means to provide input hydraulic control power;
   (b) a reversible pump associated with the power means to provide the hydraulic power;
   (c) an input clutch for the pump between the power means and the pump;
   (d) a transmission including a high-speed clutch, a low-speed clutch, and a freespool clutch;
   (e) power output means coupled to the transmission;
   (f) a motor coupled between the pump and the transmission;
   (g) means, associated with the pump, for actuating the pump and the clutches selectively, including selections of four modes: forward, reverse, brake-off, and freespool;

(h) means, including a restrictor check valve, to slow the rate at which the input clutch disengages the pump, ensuring that the pump destrokes during backdriving before the input clutch disengages.

10. The control system of claim 9 further comprising means, including a sequence valve, to deactivate the power output means by dumping the control pressure in the system and destroking the drive pump when control pressure in the system drops below a predetermined level.

* * * * *